Figure 1:
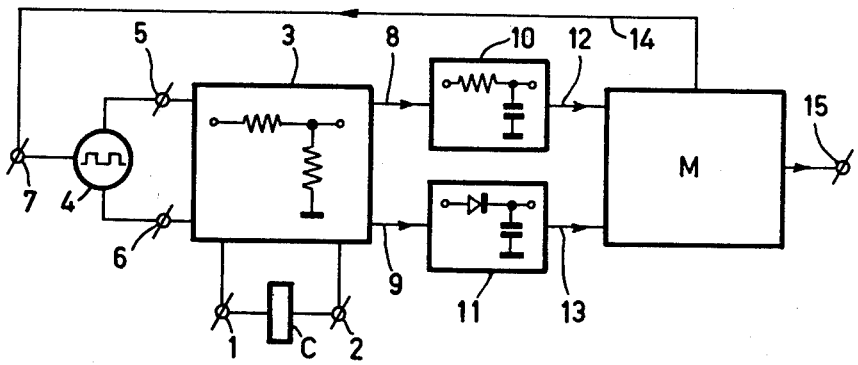

United States Patent [19]
Poolman et al.

[11] 3,952,595
[45] Apr. 27, 1976

[54] TEMPERATURE CORRECTING CIRCUIT

[75] Inventors: Petrus Jacobus Poolman; Frans Meijer, both of Eindhoven, Netherlands

[73] Assignee: U.S. Philips Corporation, New York, N.Y.

[22] Filed: Aug. 26, 1974

[21] Appl. No.: 500,457

[30] Foreign Application Priority Data
Sept. 4, 1973   Netherlands ...................... 7312147

[52] U.S. Cl. ............................... 73/359; 324/30 R; 324/105
[51] Int. Cl.² ...................... G01K 1/20; G01K 7/02
[58] Field of Search ............................ 73/359–361; 324/29, 30 R, 105

[56] References Cited
UNITED STATES PATENTS

| | | | |
|---|---|---|---|
| 2,768,266 | 10/1956 | Marsden | 13/359 X |
| 3,533,292 | 10/1970 | Engelhard | 73/359 |
| 3,852,666 | 12/1974 | Gahwiler | 324/30 R X |

*Primary Examiner*—Richard C. Queisser
*Assistant Examiner*—Frederick Shoon
*Attorney, Agent, or Firm*—Frank R. Trifari; Bernard Franzblau

[57] ABSTRACT

Physical quantities, such as temperature, mechanical stress, gas concentration and acidity, can be measured by means of elements which generate an EMF as a function of the relevant quantity. In many cases the temperature dependence of the conversion is inconvenient. The proposed temperature correcting circuit considerably reduces the said temperature influence, at least for a given operating range, in that the temperature-dependent internal resistance of the element is measured or used by means of an alternating current and the EMF is corrected by means of this temperature information.

12 Claims, 6 Drawing Figures

TEMPERATURE CORRECTING CIRCUIT

The invention relates to a temperature correcting circuit for an element which, in a temperature-dependent manner, converts a physical quantity to be measured to an EMF which can be derived as a measuring voltage from the terminals of the element, which element has a temperature-dependent internal resistance.

For the purpose of measuring physical quantities measuring transducers are used which as a rule convert the physical quantity into an electric quantity, such as a voltage or a current. Some transducers produce an EMF which is a function of the physical quantity to be measured. Thus a thermoelectric element produces a thermo-EMF which is a function of a temperature difference, a pH-electrode generates an EMF which depends upon the acidity of a liquid, a piezoelectric element produces an EMF which depends upon a mechanical stress, and a photoelectric element, such as a selenium cell, generates an EMF which is a function of the incident luminous intensity. It was found, however, that the conversion of the physical quantity into an EMF generally depends upon the temperature of the measuring element. This may be due to a physical law which applies to the conversion. For example, the EMF of a solid-state electrolyte, such as zirconium oxide, is proportional to the absolute temperature T in Kelvin and is proportional to the logarithm of the ratio between the partial pressures of a given gas, such as oxygen, in two separate spaces according to Nernst's law. Steps for eliminating this dependence upon temperature (T) have been described.

British Patent No. 1,296,761 proposes to measure the partial pressures by means of the electric current which, owing to the EMF generated at the electrode layers of a partition made of a solidstate electrolyte, flows through a resistive element the resistance of which is proportional to absolute temperature and which is disposed in the same environment as the partition. This resistive element may be a metal resistor having a positive temperature coefficient of resistance (ptc resistor), a semiconductor or a ntc resistor. Alternatively part of the partition itself may be used for this purpose.

A drawback of such a device is that in addition to the two leads of the EMF-measuring cell, one or two leads are required for the resistor and moreover there may be temperature differences between the resistor and the measuring element.

By contrast, the present invention is based on the insight that the material which generates the EMF is also capable of providing information about the temperature by means of the resistance of the material in situ. Thus the leads which supply the EMF may also be used for measuring the resistance.

According to the invention the EMF and the relevant internal resistance are simultaneously measured, the latter by means of an injection of an alternating current by means of which an alternating voltage containing the temperature information is produced across the transducer element.

For this purpose the invention is characterized in that a temperature correcting circuit of the above-described type is provided with a voltage dividing network in which the element is included and which is connected to an alternating-voltage source so that alternating current flows through the element and an alternating voltage can be derived which, owing to the internal resistance of the element, contains information about the temperature of the element. A low-pass filter which only allows the measuring voltage to pass and an alternating voltage amplitude detector provided with a smoothing filter are connected to the output terminals of the network. The circuit also includes means for processing the output voltage from the low-pass filter so as to produce across the output terminals of the circuit an output voltage which is a function of the physical quantity and which is corrected for the temperature-dependent conversion, at least for a given temperature operating range.

The voltage-dividing network may be proportioned so that an alternating voltage, the amplitude of which varies in a desired manner as a function of temperature, can be derived from the element or from a suitable dividing point. By means of rectification and further processing in a function generator a direct voltage is obtainable which has substantially the same variation as a function of temperature as has the EMF of the element for which correction is desired. By dividing one of the voltages by the other in a dividing circuit the temperature-dependent parameters which require correction can be cancelled. In some cases it may be simpler to produce the inverse temperature function in which case instead of a divider, a multiplier is to be used. The function generator may be an amplifier having a variable amplification factor and adjustable negative-feedback voltages for pivoting and shifting the transfer characteristic.

Another embodiment of a circuit according to the invention utilises the voltage-dividing properties of the network including the element as a multiplier which multiplies the supply voltage of the potentiometer by the division ratio of the potentiometer. For this purpose the EMF of the element is converted via the low-pass filter and by means of a chopper circuit into an alternating voltage which feeds the voltage-dividing network. Suitable proportioning thereof in conjunction with the internal resistance of the element makes it possible to derive an alternating voltage, the amplitude of which is proportional to the EMF of the element but is corrected for temperature, from a suitable dividing point. The said alternating voltage may serve as the output of the transducer circuit by may alternatively be rectified so that the output quantity of the transducer circuit is a direct voltage.

With given types of EMF-generating elements, such as partitions made of a solid which shows ion conductivity, the said embodiments of the temperature correcting circuit according to the invention will be very simple because the voltage-dividing network can be reduced to one or two series resistors. It then proves to be possible to largely eliminate the factor T from Nernst's law for a wide temperature range.

Figure 2:
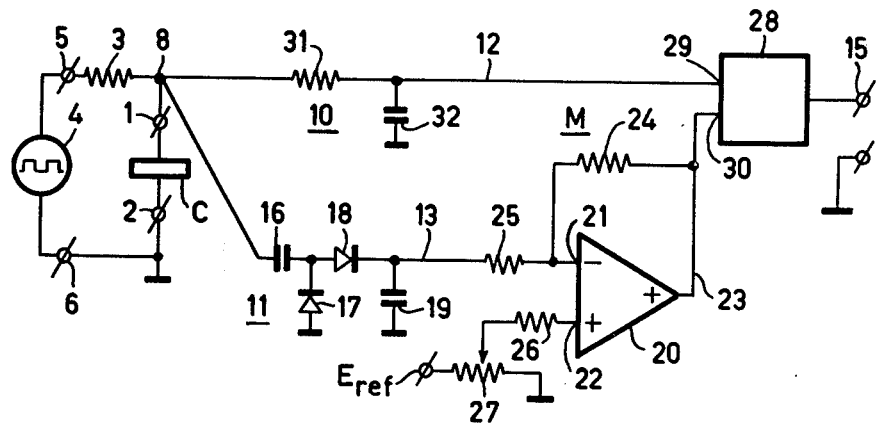
Figure 3:
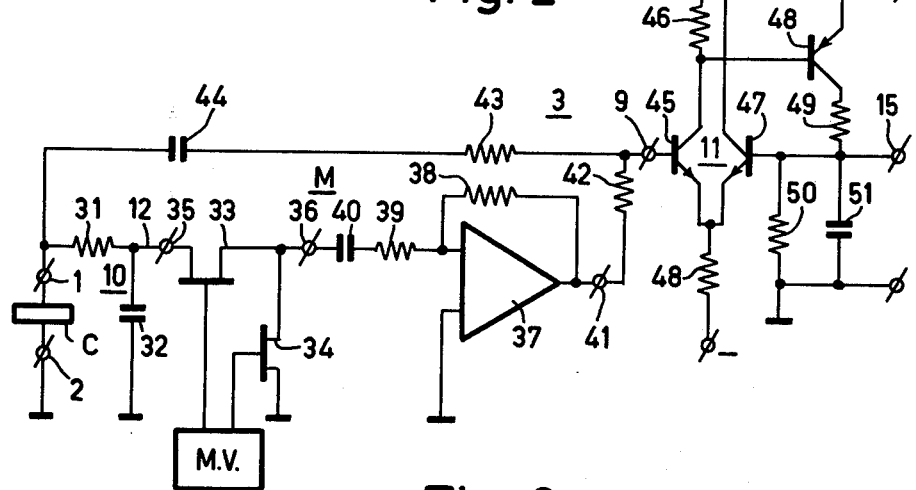
Figure 4:
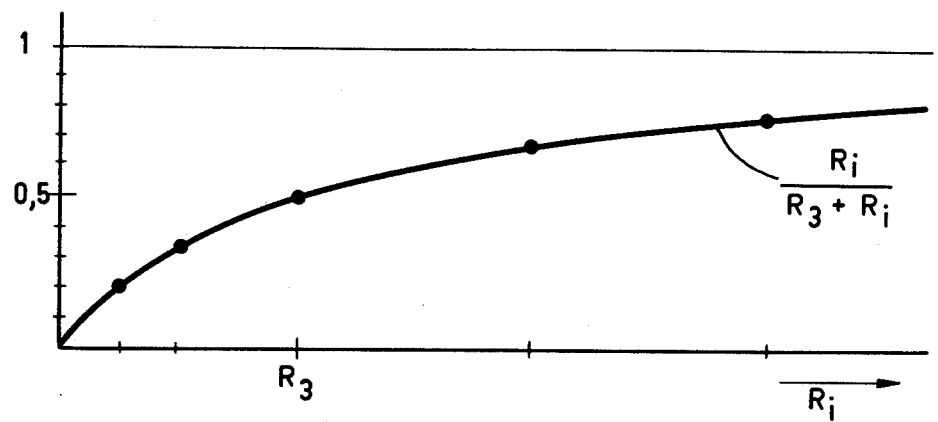
Figure 5:
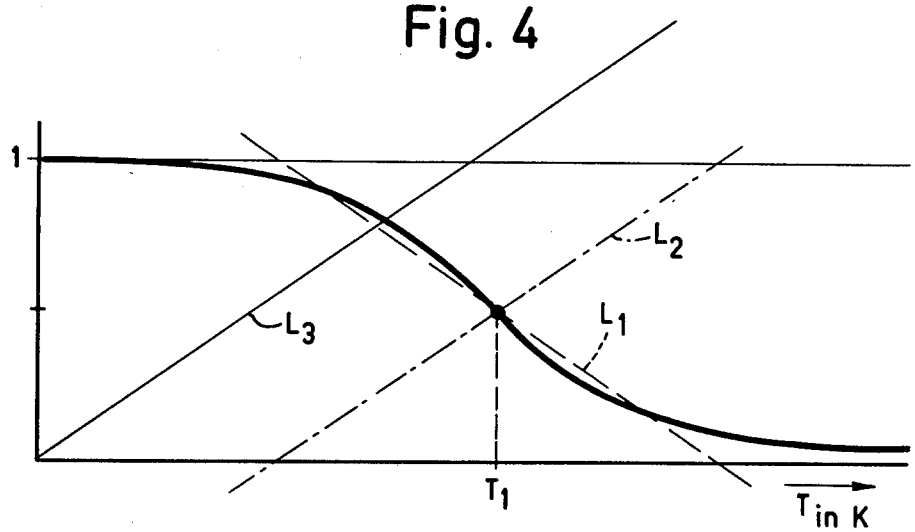
Figure 6:
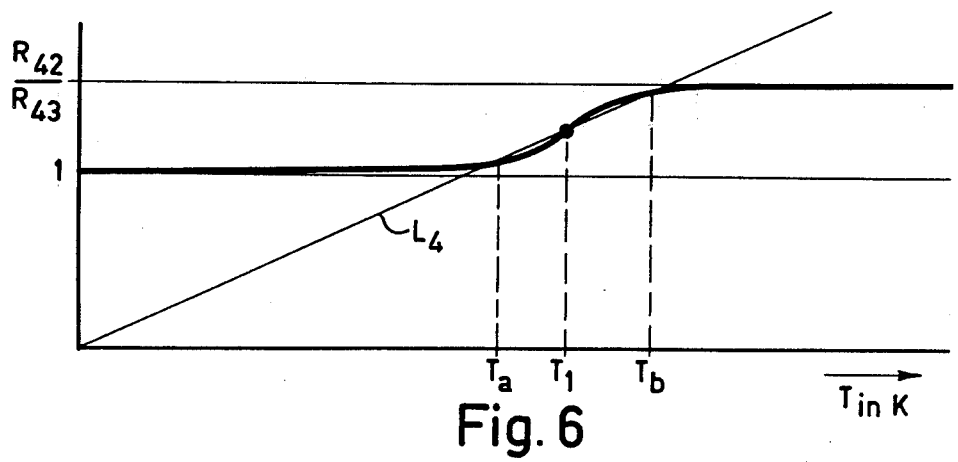

Embodiments of the invention will now be described, by way of example, with reference to the accompanying diagrammatic drawings, in which:

FIG. 1 is a schematic block diagram of a temperature correcting circuit according to the invention, FIG. 2 is a schematic circuit diagram of an embodiment which includes an EMF direct-voltage divider, FIG. 3 is a schematic circuit diagram of an embodiment which contains an EMF alternating-voltage converter including a potentiometer, FIG. 4 is a graph illustrating the operation of a voltage divider, and FIG. 5 and 6 are graphs illustrating the operation of voltage dividers which comprise temperature-dependent resistors.

Referring now to FIG. 1, the transducer element which generates an EMF as a function of a physical quantity is denoted by reference character C. Terminals 1 and 2 of the element are connected to a voltage-dividing network 3 which has input terminals 5 and 6 to which an alternating voltage supply source 4 is connected. This source supplies a square-wave or sine-wave voltage to the network 3 with the result that a corresponding current will flow through the cell C and owing to the internal resistance of C an alternating voltage will be set up across the terminals 1 and 2. Since this voltage varies with the temperature of cell C, alternating currents and alternating voltages are modulated by temperature information.

The amplitude of the voltage of the source 4 may be adjustable via a control input 7. From output terminals 8 and 9, which need not be separate, of the network 3 direct-voltage information can be derived via a low-pass filter 10, which in its simplest form comprises a series resistor and a parallel capacitor. Alternating voltage information can be derived via a rectifier circuit 11 including a smoothing filter. Thus a direct voltage which is directly proportional to the EMF generated by the element C can be produced on a line 12, and a direct voltage which contains information about the temperature of the element C can be produced on a line 13. The voltage on the line 12 can be processed in a block M, using the voltage on the line 13 or controlling the source 4 via a line 14 and the input 7, the processing being such that at an output 15 of the circuit a voltage is produced which is a function of the physical quantity to be measured but is corrected for a temperature-dependent conversion in the element C.

FIG. 2 shows an embodiment of an element C which generates an EMF one of the factors of which is absolute temperature T. The internal resistance of C is defined by $$R_i = R_o \cdot exp\ A/kT \qquad (1)$$

The voltage-dividing network can be reduced to a series resistor 3, resulting in voltage division of the constant amplitude of the alternating-voltage source 4, while an alternating voltage may be derived from the element C. For this purpose the terminal 2 of the element C is connected to the terminal 6 and to ground, and the terminal 1 of the element C is connected to the output terminal 8 to which the amplitude detector 11 is connected. The amplitude detector comprises a blocking capacitor 16, a clamping diode 17, a peak rectifying diode 18 and a smoothing capacitor 19. The direct voltage set up on the line 13 is proportional to the division ratio $$\frac{R_i}{R_i + R_3} \qquad (2)$$

where $R_i$ satisfies the equation (1) and $R_3$ is the resistance of the resistor 3 of FIG. 2.

FIG. 4 shows the voltage division as a function of $R_i$ relative to the value of $R_3$. If $R_i$ satisfies the equation (1) and the voltage division is plotted against temperature T, the graph of FIG. 5 is obtained.

FIG. 5 clearly shows that at low temperatures, according to the equation (1), $R_i$ is so large that the division ratio is substantially unity, whereas at high temperatures $R_i$ is so small that the division ratio is substantially zero. Between the said temperature ranges there is a region in which at a temperature $T_1$ the slope of the curve is a maximum, and an obvious procedure is to shift this point, the bending point, to the centre of a desired temperature operating range for a temperature correcting circuit. Thus a straight line $L_1$ can be drawn through this point at $T_1$ at which the deviations of the division ratio from this straight line are a minimum.

The division ratio in this operating range may be assumed to be substantially proportional to absolute temperature T. Returning to FIG. 2, by suitably proportioning the resistor 3 of value $R_3$ and by making zero the second derivative according to temperature of the equation (2) with the equation (1) substituted therein, the temperature $T_1$ of FIG. 5 can be shifted to the desired operating range. The curve of FIG. 5, which is approximated by the line $L_1$, then is also the value $V_{13}$ of the voltage on the line 13 in FIG. 2. Applying this voltage to an amplifier circuit having an adjustable amplifying characteristic enables a voltage to be derived which is directly proportional to temperature T. This is shown in FIG. 5 by inverting the line $L_1$ to produce a line $L_2$ which then is shifted to give a line $L_3$.

In FIG. 2 an operational amplifier 20 is used which has an inverting input 21, a non-inverting input 22 and an output 23. The amplifying circuit has an amplification factor which is determined by a resistor 24 connected between the output 23 and the input 21 and by a resistor 25 connected between the input 21 and the line 13. The input 22 is connected via a resistor 26 to an adjustable reference voltage which provides the aforementioned shift and is derived from a voltage supply source $E_{ref}$ by means of a potentiometer 27.

FIG. 2 further shows a dividing circuit 28 an input 29 of which is connected to the line 12 on which the EMF is set up which includes the factor T. An input 30 is connected to the output 23 of the amplifier circuit and has a voltage applied to it which also includes a factor T. Because the divider circuit 28 divides one of these voltages by the other, the EMF being the numerator and the voltage at the output 23 being the denominator, the output 15 of the divider circuit 28 provides a voltage which depends only upon the physical quantity to be measured and is corrected for the temperature factor T. The output 15 also is the output of the temperature correcting circuit. The divider circuit may be a multiplier circuit which comprises current source inverters and diode circuits and is commercially available in integrated-circuit from and permits not only multiplication of current but also, by a proper choice of the input, division of currents. The low-pass filter 10 comprises a series resistor 31 and a parallel capacitor 32 having a time constant such that a negligible alternating voltage is set up across the capacitor 32.

In the embodiment shown in FIG. 3 the EMF of the element C converted, via the filter 10 comprising the series resistor 31 and the parallel capacitor 32, into a square-wave voltage by means of a chopper circuit which comprises a series switch 33 and a parallel switch 34. The switching frequency is determined by a multivibrator M.V. which delivers control pulses at a frequency of, for example, 5 kHz so that the direct voltage applied to an input 35 of the chopper circuit appears at an output 36 as a square-wave voltage. An alternating-voltage amplifier circuit which comprises an amplifier 37, negative-feedback resistors 38 and 39 and a blocking capacitor 40, amplifies the square-wave voltage from the output 36. An output 41 of the amplifier is connected to the voltage-dividing network 3 so that the amplifier circuit acts as an alternating-voltage supply source for this network. The voltage-dividing network 3 comprises a resistor 42, which at one end is connected to the output 41 and at the other end to an output terminal 9, and a resistor 43, which at one end is connected to the terminal 9 and at the other end to a blocking capacitor 44 connected to the terminal 1 of the element C. The resistors 42 and 43 are so proportioned with respect to the temperaturedependent internal resistance $R_i$ of the element C that the voltage at the terminal 9 has a desired temperature dependence as a result of the voltage division of the voltage at the output 41. If the resistances of the resistors 42 and 43 are denoted by $R_{42}$ and $R_{43}$ respectively, the ratio of the voltage division is:

$$\frac{R_{43} + R_i}{R_{43} + R_i + R_{42}} \quad (3)$$

or $$\frac{1}{1 + \frac{R_{42}}{R_{43} + R_i}} \quad (4)$$

If $R_i$ satisfies the equation (1), the value of the denominator of the quotient (4) is plotted against temperature T in FIG. 6. The curve of FIG. 6 shows that similarly to that of FIG. 5 it has a bending point at a temperature $T_1$. When the element C supplies an EMF which in the conversion of the physical quantity includes a temperature factor T, the voltage division according to (4) is preferably made to include a factor 1/T so that from the terminal 9 of FIG. 3 an alternating voltage can be derived which is related to the physical quantity only and in which in the numerator the factor T of the conversion is cancelled by the factor T in the denominator of the voltage divider. As FIG. 6 shows, the voltage divider comprising the resistors 42 and 43 of FIG. 3 must be designed so that a line $L_4$ is approximated as far as possible.

Arithmetical processing of the division according to (4) by means of the equation (1) shows that $R_{43}$ mainly determines the bending point at the temperature $T_1$ in FIG. 6 and that the value $R_{42}$ mainly determines the points of intersection of the curve with the line $L_4$ at temperatures $T_a$ and $T_b$, thus permitting the effective operating range of the temperature correcting circuit according to the invention to be set.

In the embodiment of FIG. 3 the alternating voltage set up at the terminal 9 is rectified by the rectifier circuit 11. If desired, this voltage at the terminal 9 may also be used for further processing of the measuring values.

The circuit 11 of FIG. 3 comprises a differential amplifier of the long-tailed-pair type which includes a transistor 45 having a collector resistor 46 and a transistor 47, the emitters of the transistors being connected to one another and, through a resistor 48, to a negative voltage. The base of the transistor 45 is connected to the terminal 9 and the base of the transistor 47 is connected to the output terminal 15. Between the collector of the transistor 45 and the base of the transistor 47 a negative-feedback path is provided which comprises a transistor 48 the base of which is connected to the said collector, the emitter of which is connected to a positive voltage and the collector of which is connected via a resistor 49 to the base of the transistor 47. A discharge resistor 50 and a smoothing capacitor 51 are connected between the base of the transistor 47 and ground. The entire circuit operates so that the peak amplitude of the alternating voltage at the terminal 9 is equal to the direct voltage which is set up across the capacitor 51 and hence can be derived from the terminal 15.

By way of example it should be mentioned that if the element C is a partition of zirconium oxide for measuring the ratio between partial oxygen pressures in the temperature range betwen 450°C and 850°C, the influence of temperature is decreased by a factor of at least 7 with respect to the temperature dependence due to the factor T in the EMF. The resistance $R_{42}$ is equal to 0.35 times $R_i$ at about 620°C, and the resistance $R_{43}$ is about 0.66 times $R_i$. Depending upon the temperature limits which define the operating range and upon the permissible temperature influence, values of $R_{42}$ are found which are between 0.3 and 0.6 times the value of $R_i$ at a temperature near the central part of the operating range, in which part the bending point, which is indicated by $T_1$ in FIGS. 5 and 6, is also situated. The value of the resistor 43 then lies between 0.6 and 0.8 times that of $R_i$.

What is claimed is:

1. A temperature correcting circuit for a transducer element having a temperature-dependent internal resistance and which, in a temperature-dependent manner, converts a physical quantity to be measured into an EMF which can be derived as a measuring voltage from the terminals of the element comprising a source of alternating voltage, means connecting the element in a voltage-dividing network which is connected to said alternating-voltage source so that an alternating current flows through the element to derive an alternating voltage which, owing to the internal resistance of the element, contains information about the temperature of the element, a low-pass filter which allows only the measuring voltage to pass, an alternating-voltage amplitude detector which includes a smoothing filter, means connecting said low-pass filter and said amplitude detector to the output terminals of the voltage dividing network, and means for processing the output voltage from the low-pass filter to produce an output voltage at the output terminals of the circuit which is a function of the physical quantity and is corrected for the temperature-dependent conversion, at least for a given temperature operating range.

2. A circuit as claimed in claim 1 wherein said processing means include a divider circuit having a first input connected to receive the output voltage of the low-pass filter and a second input connected to an amplifier circuit which has an adjustable amplification characteristic, means connecting an input of the amplifier circuit to the smoothing filter, and means connecting the output of the divider circuit to the output terminals of the circuit.

3. A circuit as claimed in claim 1 wherein said processing means include a chopper circuit having an input connected to receive the output voltage of the low-pass filter and an output connected to an alternating-voltage amplifier which has a fixed amplification factor and forms a part of said alternating-voltage source, and means connecting the smoothing filter to the output terminals of the circuit.

4. A circuit as claimed in claim 1 wherein the element comprises a solid electrolyte and delivers a measuring voltage which is proportional to the absolute temperature T in degrees Kelvin and the internal resistance of which is defined by $R_i = R_o \exp A/kT$, where $R_i$ and $R_o$ are reistance values, A is a constant and $k$ is Boltzmann's constant, and wherein the voltage-dividing network includes a resistor which is connected in series with the alternating-voltage source and with the element and has a value which lies between 0.6 and 0.8 times the value of the element internal resistance at a temperature near the central part of the temperature operating range, the output terminals of the voltage dividing network also being the output terminals of the element.

5. A circuit as claimed in claim 1 wherein the element comprises a solid electrolyte and delivers a measuring voltage which is proportional to the absolute temperature T in degrees Kelvin and the internal resistance of which is defined by $R_i = R_o \exp A/kT$, where $R_i$ and $R_o$ are resistance values, A is a constant and $k$ is Boltzmann's constant, and wherein the voltage-dividing network includes a series combination of a first and a second resistor, and the alternating voltage source includes an amplifier circuit, means connecting the first resistor to the amplifier circuit, said first resistor having a resistance value which lies between 0.3 and 0.6 times the value of the transducer element internal resistance at a temperature situated near the central part of the temperature operating range, means connecting the second resistor to one terminal of the element, the second resistor having a resistance value which lies between 0.6 and 0.8 times said value of the element internal resistance, and wherein the low-pass filter is connected to the element and the amplitude detector is connected to the junction point of the first and second resistors.

6. A circuit as claimed in claim 1 wherein said processing means includes a multiplier circuit having a first input connected to receive the output voltage of the low-pass filter and a second input connected to an amplifier circuit having an adjustable amplification characteristic, means connecting an input of the amplifier circuit to the smoothing filter, and means connecting the output of the multiplier circuit to the output terminals of the circuit.

7. A measuring apparatus with means for compensating the temperature-dependence of a transducer element which converts a physical quantity into an electrical quantity in a temperature-dependent manner comprising, a transducer element having a temperature-dependent internal resistance and which converts a physical quantity to be measured into a measuring voltage at the terminals of the transducer element, a source of alternating voltage, a voltage divider network including said transducer element and coupled to said alternating voltage source whereby an alternating voltage which varies as a function of the temperature of the element is developed across a pair of terminals of the voltage divider network, a low pass filter which passes only the measuring voltage, an amplitude detector including a filter, means coupling said low pass filter and said amplitude detector to terminals of the voltage divider network at which the measuring voltage and the temperature-dependent alternating voltage appear, and processing means coupled to the output of the low pass filter and responsive to the measuring voltage and to a voltage proportional to the temperature-dependent alternating voltage to derive an output voltge determined by the physical quantity and compensated for the temperature-dependence of the transducer element.

8. An apparatus as claimed in claim 7 wherein said processing means includes means for subtractively combining first and second input voltages, and means coupling the input of the combining means to the output of the low pass filter and to the filtered output of the amplitude detector.

9. An apparatus as claimed in claim 7 further comprising feedback means coupling the processing means to a control input of the alternating voltage source for adjusting the amplitude of the alternating voltage source.

10. An apparatus as claimed in claim 7 further comprising an amplifier having an adjustable gain factor, and wherein said processing means comprises means for combining first and second input voltages to derive an output voltage that is the difference of the two input voltages, means connecting first and second inputs of said combining means to the outputs of the low pass filter and the amplifier, respectively, and means connecting the input of the amplifier to the filtered output of the amplitude detector.

11. An apparatus as claimed in claim 7 wherein said alternating voltage source includes an amplifier and said processing means includes a chopper circuit having an input connected to the output of the low pass filter and an output connected to an input of said amplifier, and wherein the derived output voltage appears at the filtered output of the amplitude detector.

12. An apparatus as claimed in claim 11 wherein the voltage divider network includes first and second resistors connected in series with the transducer element to the output of the amplifier, the input of the low pass filter being connected across the transducer element and the input of the amplitude detector being connected to a tap point on the voltage divider network.

* * * * *